Dec. 20, 1966  W. FUHR  3,292,289
MEANS FOR TRANSILLUMINATING AN INDICATOR PRESENTATION
Filed March 8, 1963  2 Sheets-Sheet 1

INVENTOR.
WOLFGANG FUHR
BY
ATTORNEY

Dec. 20, 1966  W. FUHR  3,292,289
MEANS FOR TRANSILLUMINATING AN INDICATOR PRESENTATION
Filed March 8, 1963  2 Sheets-Sheet 2

INVENTOR.
WOLFGANG FUHR
BY Herbert L. Davis
ATTORNEY

United States Patent Office 3,292,289
Patented Dec. 20, 1966

3,292,289
MEANS FOR TRANSILLUMINATING AN INDICATOR PRESENTATION
Wolfgang Fuhr, Hasbrouck Heights, N.J., assignor to The Bendix Corporation, Teterboro, N.J., a corporation of Delaware
Filed Mar. 8, 1963, Ser. No. 263,936
5 Claims. (Cl. 40—96)

This invention relates to novel means for transilluminating indicator presentations and more particularly to a novel means of backlighting or transilluminating a counter display segment.

An object of the invention is to provide a novel indicator means including a sprocket having means of illumination mounted therein, and which sprocket is adapted to be driven by a translucent perforated tape, said tape having indicator numerals printed theron and perforations in the tape ensuring that the numerals on the tape coincide with openings in the sprocket to cause the tape to be transilluminated, and further, the idler sprocket may include teeth so arranged as to cooperate with the perforations in the tape so as to prevent light from within the idler sprocket from passing therethrough.

Another object to the invention is to provide an arrangement including an idler sprocket having holes in its peripheral edge allowing light from within the sprocket to pass therethrough to illuminate suitable indicator markings on a portion of a tape carried by the sprocket.

Another object of the invention is to provide a perforated tape arrangement to synchronize openings provided in an adler sprocket with the tape so as to effectively illuminate suitable indications on the tape.

Another object of the invention is to provide a tape including perforations cooperating with suitable teeth on the idler sprocket which penetrate the perforations provided in the tape so as to prevent light rays from a source of light within the idler sprocket from passing through such perforations in the tape.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
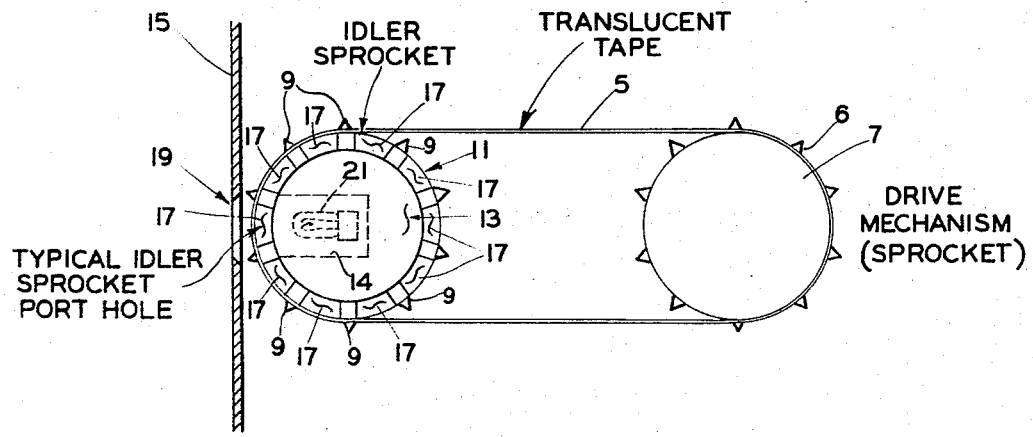
FIGURE 1 is a drawing schematically illustrating the invention as applied to a system for transilluminating counter presentations.

Referring to the drawing of FIGURE 1, there is indicated by the numeral 5 a translucent perforated tape which meshes with both the teeth 6 of a drive mechanism sprocket 7, as well as the teeth 9 of an idler sprocket 11. The idler sprocket 11 is free to rotate on a stationary idler sprocket bearing 13 and does so when driven by the tape 5. There is formed in the bearing 13 a radial slot 14 opening at the peripheral edge of the bearing 13.

The idler sprocket 11 has "portholes" or slots 17 through a peripheral edge of the sprocket 11 which synchoronize with indicator numbers on the perforated translucent tape 5 as the same come into view through a counter aperture 19 in an indicator mask or casing 15. The aperture 19 is in alignment with the radial slot 14 in th bearing 13.

A source of light which may be an incandescent or electroluminescent lamp 21 is fixedly mounted within the slot 14 of the stationary idler sprocket bearing 13. The lamp 21 is so arranged as to direct light rays through the radial slot 14 and out the opening in the peripheral edge of the sprocket 11.

Figure 2:
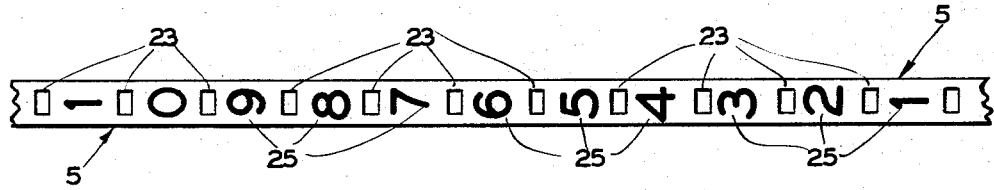
FIGURE 2 is a fragmentary plan view of a tape to be applied to the system of FIGURE 1.
Figure 3:
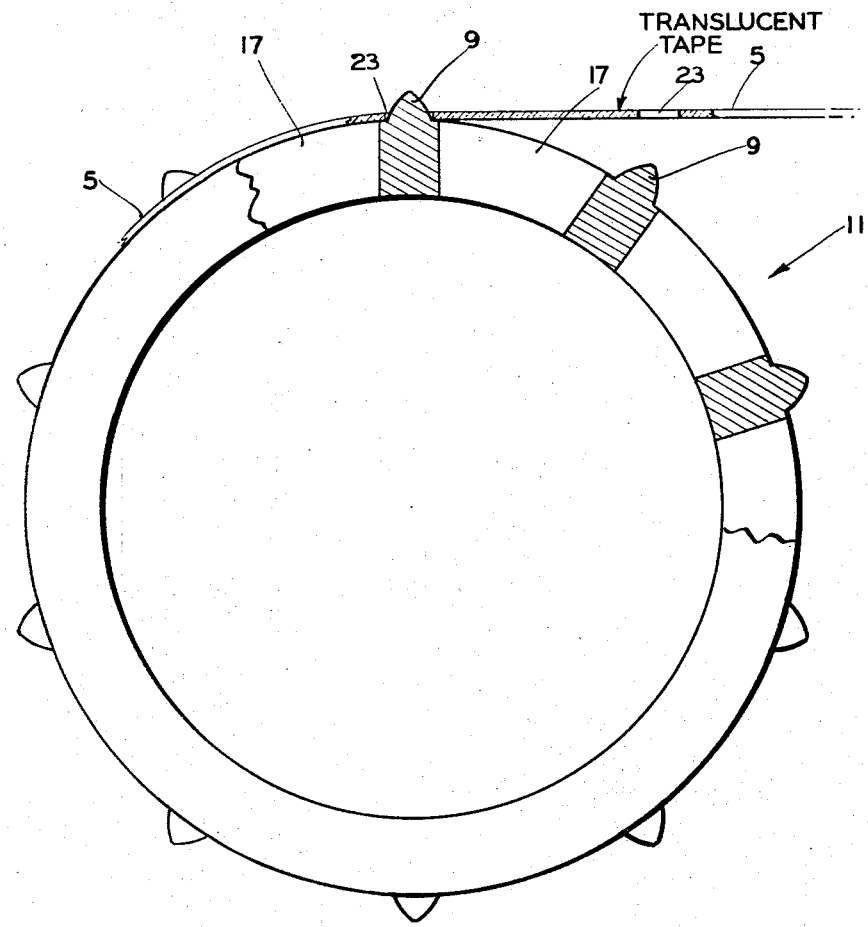
FIGURE 3 is an enlarged partial sectional end view of an idler sprocket to be applied to the system of FIGURE 1 and illustrating the teeth thereof arranged for cooperation with the perforations in the tape of FIGURE 2 so as to prevent passage of light rays through such perforations while the idler sprocket is being driven by the tape.
Figure 4:
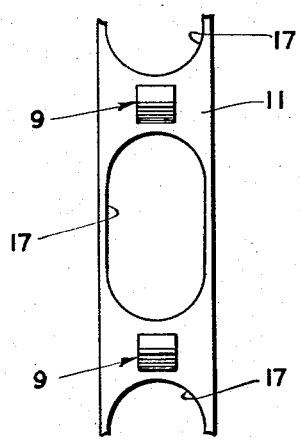
FIGURE 4 is a fragmentary edge view of the idler sprocket illustrating the arrangement of teeth of the idler sprocket in relation to light openings in the idler sprocket for the transillumination of indicator numerals on the tape.

When the tape 5 is driven by the drive mechanism sprocket 7, the idler sprocket 11 is in turn driven by the transluent tape 5 through the teeth 9 and rotates on the bearing 13. Perforations 23 in the tape 5, as shown in FIGURE 2, assure that translucent indicator numerals 25 provided on the tape 5 coincide or "line-up" with the "portholes" or slots 17 in the idler sprocket 11 and the opening of the slot 14 at the peripheral edge of bearing 13. Therefore, every time an indicator number 25 on the tape 5 comes into view through the aperture 19 in the indicator mask or casing 15, the "porthole" or slot 17 is positioned immediately underneath such indicator numeral 25 provided on the tape 5. Light rays from the lamp 21 are therefore free to penetrate through both the "porthole" 17 in the idler sprocket 11 and the translucent indicator number 25 on the tape 5 which lines up with the "porthole" 17. The tape is therefore transilluminated.

The idler sprocket teeth 9 may be of a color corresponding to that of the background of the tape 5 so as to blend therewith. Thus the sprocket teeth 9 may be colored black so as to blend with a background on the tape 5 of black.

From the foregoing, it will be seen that there has been provided a novel arrangement in which the idler sprocket 11 is arranged with slots 17 in its peripheral edge allowing light from the lamp 21 from within its bearing to pass through the slots 17. There is further provided a perforated tape 5 arranged to cooperate with the idler sprocket 11 so as to synchronize with the "portholes" or slots 17 in the idler sprocket 11 which it drives. Furthermore, the perforations in the tape 5 are so arranged in relation to the teeth 9 as to prevent light from the lamp 21 from penetrating through the perforations 23 because of the "light blocking" idler sprocket teeth 9.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An indicator device comprising an indicator mask having an aperture therein for viewing reference indications, a translucent tape bearing a series of reference indications, an idler sprocket carrying a portion of the indicator tape adjacent the aperture in the indicator mask, a drive mechanism sprocket bearing another portion of the translucent tape for driving the tape and sprocket in relation thereto, a source of light rays positioned within the idler sprocket, the idler sprocket including slots in the peripheral edge thereof, and means carried by the idler sprocket to synchronize the slots with the reference indications on the translucent tape as the same come into view through the aperture in the indicator mask whereupon the source of light rays within the idler sprocket may be effective to transilluminate the reference indication on the tape in alignment with the aperture in the indicator mask and the slot in the idler sprocket being in coincidence therewith.

2. The combination defined by claim 1 in which the translucent tape includes perforations therein and the means carried by the idler sprocket includes teeth cooperating with the perforations in the tape and so arranged as to block the passage of light through said perforations from the source of light rays.

3. Means for transilluminating a selected reference indication, said means comprising a translucent tape bearing a series of reference indications and a series of perforations, a sprocket having radially outwardly extending teeth for engaging said perforations and carrying a portion of the translucent tape, a source of light rays positioned within the sprocket, said sprocket including slots in the peripheral edge thereof, an indicator mask having an aperture therein for viewing a selected reference indication in alignment therewith, the reference indications on the tape arranged to selectively coincide with one of said slots in the idler sprocket and the mask aperture so that light from the source of light rays within the sprocket may be directed through the selected slot and reference indication on the tape to effectively transilluminate the selected reference indication viewed through the aperture in the indicator mask.

4. The combination comprising an indicator mask having an aperture therein through which reference indicators may be viewed, a translucent tape carrying such reference indications, an idler sprocket bearing a portion of the translucent tape adjacent the aperture in the indicator mask, means for driving the tape and the idler sprocket through the tape, the idler sprocket including teeth, the translucent tape having perforations therein operatively engaged by the teeth of the idler sprocket, a fixed bearing rotatably supporting the idler sprocket, the bearing having a radial slot therein, a source of light rays mounted within the radial slot of the bearing, the idler sprocket including slots in the peripheral edge thereof being arranged to selectively coincide with a reference indication on the translucent tape and the radial slot of the bearing upon the selected slot being in alignment with the aperture in the indicator mask, whereupon light rays from the source are directed through the selected slot in the idler gear and the indicator reference on the tape in alignment with such slot and aperture in the indicator mask so as to effectively transilluminate the tape and the selected indicator reference thereon.

5. Means for transilluminating a selected reference indication, said means comprising a translucent tape bearing a series of reference indications and a series of perforations, a sprocket having radially outwardly extending teeth for engaging said perforations and carrying a portion of the translucent tape, a source of light rays positioned within the sprocket, said sprocket including first means in the periphery thereof for permitting passage therethrough of light rays from said source, an indicator mask including second means therein for permitting a viewing of a selected reference indication in alignment therewith, the reference indications on the tape being arranged to be selectively aligned with the first means in the idler sprocket and the second means in the mask so that light rays from said source within the sprocket may be directed through the first means and the selected reference indication on the tape to effectively transilluminate the selected reference indication for viewing through the second means in the indicator mask.

References Cited by the Examiner

UNITED STATES PATENTS

| | | | |
|---|---|---|---|
| 907,497 | 12/1908 | Henderson | 40—77 X |
| 3,040,458 | 6/1962 | Mathews | 40—77 |

EUGENE R. CAPOZIO, *Primary Examiner.*

JEROME SCHNALL, *Examiner.*

J. W. WILL, *Assistant Examiner.*